Sept. 29, 1970 M. TURKAT 3,531,249
PYROLYTIC GRAPHITE FILAMENTS
Filed Nov. 7, 1966 2 Sheets-Sheet 1
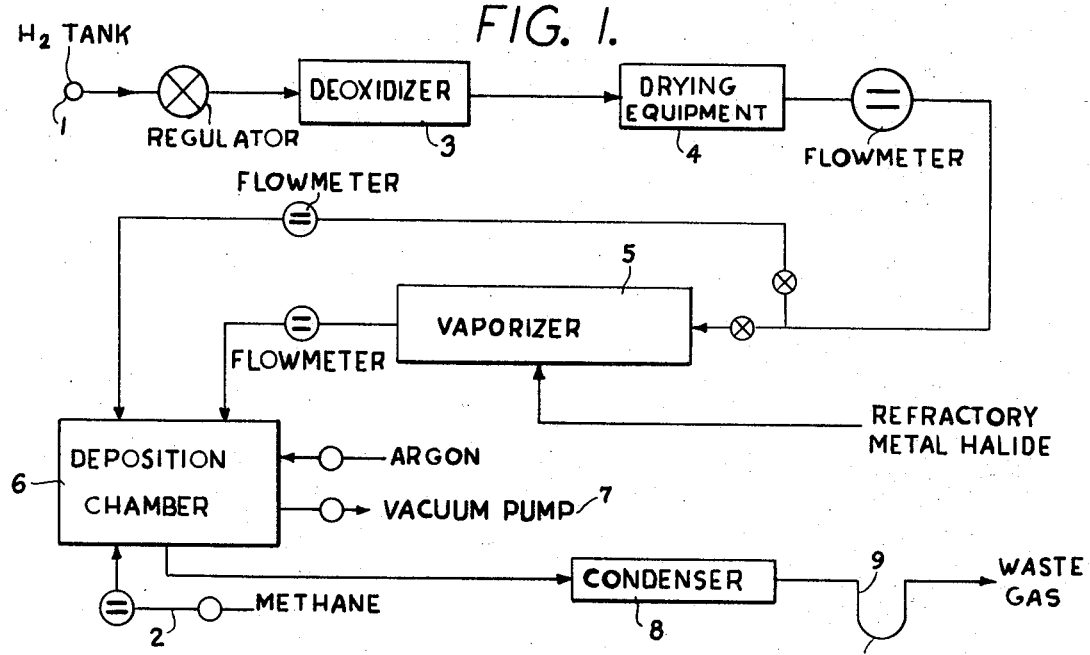
FIG. 1.
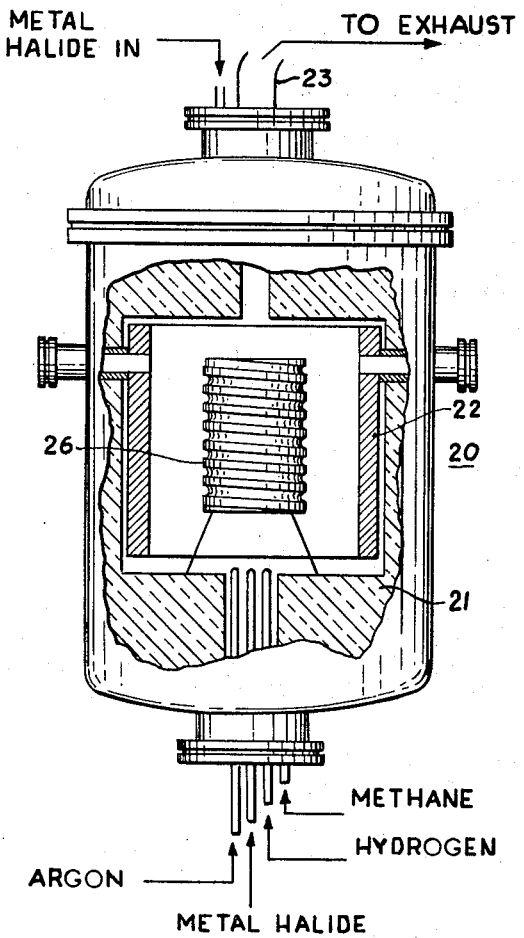
FIG. 2.
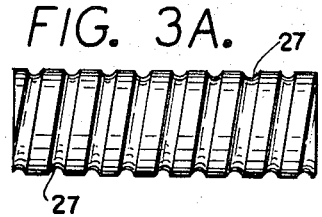
FIG. 3A.
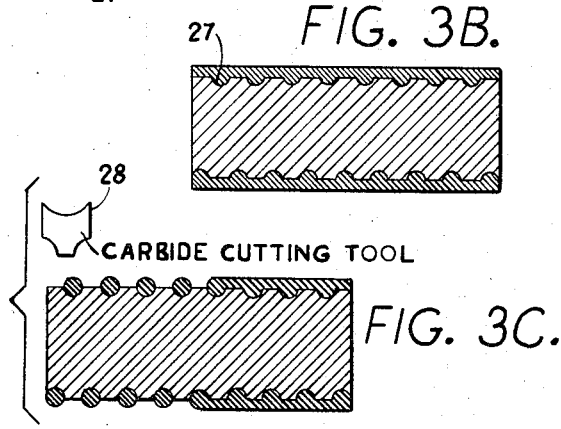
FIG. 3B.
FIG. 3C.
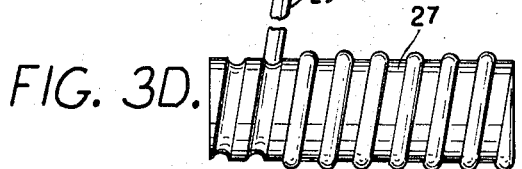
FIG. 3D.
INVENTOR.
MICHAEL TURKAT
BY
ATTORNEY Sept. 29, 1970   M. TURKAT   3,531,249
PYROLYTIC GRAPHITE FILAMENTS
Filed Nov. 7, 1966   2 Sheets-Sheet 2

INVENTOR.
MICHAEL TURKAT
BY
ATTORNEY

United States Patent Office 3,531,249
Patented Sept. 29, 1970

3,531,249
PYROLYTIC GRAPHITE FILAMENTS
Michael Turkat, Bayside, N.Y., assignor, by mesne assignments, to Pfizer Inc., New York, N.Y., a corporation of Delaware
Continuation-in-part of application Ser. No. 361,480, Apr. 21, 1964, which is a continuation-in-part of application Ser. No. 130,153, Aug. 8, 1961, now abandoned, which in turn is a continuation-in-part of application Ser. No. 361,492, Apr. 21, 1964, now Patent No. 3,375,308, dated Mar. 26, 1968. This application Nov. 7, 1966, Ser. No. 592,584
Int. Cl. C01b *31/04, 31/07*
U.S. Cl. 23—209.2   5 Claims

ABSTRACT OF THE DISCLOSURE

High purity and non-melting ablative material, particularly pyrolytic graphite, having substantially enhanced physical properties as a result of longitudinal stretching at elevated temperatures. Thermal conductivity at room temperature parallel to the basal planes is higher than that of any known material. Thermal conductivity perpendicular thereto is lower by several orders of magnitude. Tensile strength at room temperature exceeds 20,000 p.s.i. and at 5000° F. reaches as high as 80,000 p.s.i. The method of manufacture, also disclosed, yields polycrystalline material having high degrees of electrical anisotropy.

---

This invention relates to filaments and more particularly to high purity and non-melting refractory filaments.

The present invention is a continuation-in-part of applicant's copending application, Ser. No. 361,480 filed Apr. 21, 1964, since abandoned, which was in turn a continuation-in-part of application Ser. No. 130,153, filed Aug. 8, 1961, since abandoned; and is related to applicant's copending application, Ser. No. 361,492, filed Apr. 21, 1964, now Pat. No. 3,375,308 issued Mar. 26, 1968.

Filaments for various applications, such as lamps, vacuum tubes and the like, have heretofore been made of materials that melt or can be easily extruded or drawn in a softened state or cold stretched, as in the case of wire filaments.

An object of this invention is to provide high-temperature-resistant, high-strength filaments in continuous lengths of one to 1,000 feet or more from refractory metal or ablative materials, such as pyrolytic graphite.

Another object of the invention is to provide filaments of refractory materials, some of which are ablative and which do not melt under intense heat or have melting points so high that prior methods of wire production are not applicable.

A further object of the invention is to provide a filament having substantially enhanced physical properties as a result of stretching in the longitudinal direction at elevated temperature.

A feature of the invention is a continuous, elongated filament formed of the class of ablative materials including pyrolytic graphite, carbides and combinations of these with refractory metals and alloys thereof.

Another feature of the invention is a high purity, non-melting crystalline filament of ablative material formed by the process of cracking or decomposing suitable gases or mixtures of gases under extremely high temperatures.

Another feature of the invention is the provision of pyrolytic graphite or carbides to protect refractory metals, such as tungsten, molybdenum or non-metals.

Still another feature is a pyrolytic graphite filament incorporating metal or metal carbide in the crystal lattice thereof, or in a uniform coating on the surface.

Another feature of the invention is a high-purity, non-melting, non-porous filament of appreciable length, formed by the process of cracking or decomposing suitable gases or mixtures of gases under extremely high temperatures and thereby causing the deposition of carbon and carbides on suitable mandrels.

The vapor decomposition technique with deposition of filament on spiral- or straight-grooved mandrels permits fabrication of shapes from ablative refractory materials which are difficult to work with by other methods. The resulting products are characterized by high purity, non-porosity, crystallinity and operability at superhigh temperatures in the range from 500°–10,000° F.

For example, starting with a hydrocarbon gas, metered amounts of refractory metal halide vapors can be introduced along with hydrogen to produce a pyrolytic graphite incorporating refractory metal or metal carbide in the crystal lattice.

An alternate procedure entails final treatment of the pyrolytic graphite with a mixture of refractory metal halide and hydrogen, yielding a coating of pure metal. Further heat treatment yields an adherent coating by diffusion bonding to the graphite composite substrate through the formation of an intermediate carbide layer.

The materials provided in accordance with the invention have properties and characteristics suitable for application to missile cones, rocket nozzles, missile body sections, extremely high temperature furnace linings and for high-temperature piping, filament-wound containers for solid fuel in missiles and the like.

Other features of the invention will become apparent to those skilled in the art when the following disclosure is read in connection with the accompanying drawings.

FIG. 1 is a schematic diagram of a process for forming refractory and ablative filaments in accordance with the invention.

FIG. 2 is an elevational view partially broken away of the high temperature furnace for producing filaments in accordance with FIG. 1.

FIGS. 3A to 3E are various perspective and sectional views of threaded mandrels involved in the process of coating and fabricating the filaments illustrated in FIGS. 1 and 2.

Figure 3E:

Some typical ablative materials utilized in filament formation in accordance with the invention, are those of the carbon family. It is well-known that carbon is one of the few elements that does not melt under extremes of temperature. Carbon usually recrystallizes and orients under high temperature to form graphite and it sublimes at still higher temperatures. It is not ductile at ordinary temperatures, which makes it a very difficult material to work. However, by means of the vaporization and cracking processes described in accordance with the invention, carbon and carbon-base materials, pyrolytic graphite, carbides, refractory metal alloys or combinations of these with ablative materials are now provided for fabrication of special filaments and of shapes difficult to make by conventional materials and methods.

The various materials provided in accordance with the invention have special properties, among which are the facts that they will not melt at superhigh temperatures, that they dissipate heat primarily by radiation and by evaporation of material through sublimation.

Since the temperature limit for elemental solids and compounds is in the neighborhood of 7,000–8,000° F., surface temperatures in excess of this will result in melting, evaporttion or sublimation of the material exposed to such high temperature environments. The ability of any material to withstand these extreme temperatures is a function of time and energy input required to raise the surface temperature of the material to that point.

The term "pyrolytic graphite" as used herein represents a pure polycrystalline graphite deposited from a carbon-bearing vapor at temperatures around 3450°–5000° F. or higher. It is a metallic appearing material that is impervious to gases; is stronger than commercial graphite; and exhibits a greater degree of anisotropy in a number of physical and chemical properties, for example, thermal and electrical, than natural graphite. At room temperatures, its thermal conductivity along the basal planes, parallel to the deposition surface, is higher than that of any other known material. The thermal conductivity perpendicular to the layer planes or deposition surface is lower by several orders of magnitude. The basal planes of the pyrolytic carbon crystallites tend to align parallel to the surface of deposition, and this orientation is a function of deposition temperature and density.

With respect to mechanical properties, pyrolytic graphite provides tensile strengths which exceed 20,000 p.s.i. at room temperature and in the basal plane. With increasing temperature, the pyrolytic graphite attains tensile strengths reaching values as high as 80,000 p.s.i. at 5,000° F. (i.e. 2,750° C.). Thus, for this temperature range, pyrolytic graphite is ten times stronger than ordinary commercial graphites. In addition, where commercial graphites begin to lose strength at temperatures above 4500° F., pyrolytic graphite's strength increases by a factor of two from 4500° F. to 5000° F. Likewise, its ductility also increases at temperatures in excess of 4500° F. The stress-strain curves for pyrolytic graphite indicate a considerably greater strength than other materials at high temperatures and on a strength to weight basis, it is superior by a factor of 5 to any other known material.

It is known that fine filaments of materials have much greater tensile strength than the same materials in bulk form. Whiskers or single-crystal filaments of pure materials have tensile strengths of approximately $1 \times 10^6$ p.s.i. Thus, graphite whiskers have measured tensile strength at room temperature of the order of $3 \times 10^6$ p.s.i. However, high-temperature forms of pyrolytic carbon filaments produced by the processes herein described have unusually high tensile strengths, and above 2500° C. (4500° F.) higher than any other known material. Since this material has a density of .07 lb./inch$^3$, this represents a strength to weight ratio of $1.5 \times 10^6$ at 5000° F.

Pyrolytic carbon with its high strength at superhigh temperatures, can be used in combination with a ceramic or glass filament for high strength at low temperatures and provides an ideal high-strength, light-weight missile component.

Referring to FIG. 1, a hydrocarbon gas, such as methane, propane, benzene, butane, acetylene, ethane or toluene and hydrogen from inlets 1 and 2 respectively, are purified and dried in a conventional manner, for example by a deoxidizer 3 and a dryer 4 in the case of hydrogen. These gases may be mixed with a metered amount of refractory metal halide in a vaporizer 5.

A programmed deposition in vacuum chamber 6, evacuated by pump 7, may be terminated with a nearly stoichiometric mixture of halide and hydrocarbon, thus resulting in a final coating of pure carbide on a suitable base or deposition surface. The waste gases are removed by being passed through a condenser 8 and trap 9.

Figure 4:
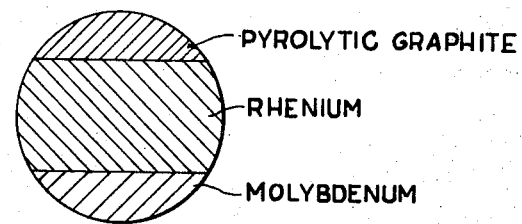
FIG. 4 shows an ablative filament of refractory materials deposited by the methods illustrated in FIGS. 1 and 2.

Various combinations and layers of metal can be formed in this manner as shown in FIG. 4, for example, successive layers of molybdenum, rhenium and pyrolytic graphite. Other combinations may be formed to thereby create a wide variety of ablative filaments with layered refractory materials. The pyrolytic graphite can be produced over a wide density range dependent on the temperature of preparation. Higher densities result from a higher degree of crystallite orientation at higher temperatures. Densities of 1.95 to 2.24 grams per cc. are readily obtained.

Referring to the gas cracking apparatus of FIG. 2, the vacuum furnace 20 is water-cooled and its inner walls 21 are coated or insulated with ceramic material. It is heated by a graphite resistance element 22 to a temperature sufficiently high to crack the various gas vapors such as refractory metal halide and methane which are allowed to enter it under controlled feed (FIG. 1). At this high temperature, the various gases become intimately mixed and undergo decomposition. The waste gases are drawn off in the exhaust 23 corresponding to the condenser 8 and trap 9 of FIG. 1. The metallic and/or carbon vapors from the decomposed gases are deposited as refractory metal and ablative filament material on a mandrel 26.

The mandrel 26 is constructed with a spiral thread 27 running its length as shown in FIG. 3A. However, straight grooves on a mandrel for straight lengths may be utilized as illustrated in FIG. 3E.

As the decomposed gases and vapors are deposited on the mandrel 26, the spiral threads 27 are filled with ablative refractory material, thus making a smooth uniform coating over the entire mandrel, as illustrated in FIG. 3B.

After a smooth coating has been laid down, the vacuum furnace 20 is shut down, the mandrel 26 is removed therefrom and machined by a sharp cutting tool or diamond wheel 28 to the top of the mandrel thread 27 as illustrated in FIG. 3C. Then the filament 29, which is embedded in the mandrel threads is removed freely therefrom to be subsequently utilized for any desired purpose.

Pure crystalline filaments of ablative materials formed by the process described in connection with FIGS. 1 and 2, as well as filaments formed from a combination of pure refractory metals, pyrolytic graphite, refractory metallic carbides or silica, may be manufactured in accordance with the aforementioned processes for depositing ablative materials from metallic vapors and hydrogen gases cracked in high temperature vacuum furnaces. The length, diameter, shape and combination of refractory and ablative materials may be proportioned in accordance with a particular use desired, and encompass coiled lengths of 1000 feet or more. Also, the various filaments per se or combined with various binders, as disclosed herein, may be utilized in continuous lengths of at least about a foot for spiral winding to form rocket body structures as well as various intricate shapes capable of withstanding very high temperatures and pressures.

The data for an actual run, in this case to produce pure pyrolytic graphite filaments, is illustrated by the following charts.

Chart I shows filament density as a function of deposition temperature, wherein the chamber pressure was 4 mm. Hg. and the gas flow which was adjusted to maintain this pressure was 6 liters per minute. The hydrocarbon source gas used was chemically pure methane.

CHART I

| Density (gm./cc.) | Temperature (degrees cent.) |
|---|---|
| 1.95 | 1900 |
| 2.15 | 2000 |
| 2.24 | 2100 |
| 2.24 | 2200 |
| 2.24 | 2300 |

Chart II shows the deposition rate of the pyrolytic graphite filaments as a function of deposition temperature, chamber pressure being 4 mm. Hg. and the gas flow being 6 liters per minute. The hydrocarbon source gas used was chemically pure methane.

CHART II

| Deposition rate (mils/hour): | Temperature (degrees cent.) |
|---|---|
| 10 | 1900 |
| 15 | 2000 |
| 18 | 2100 |
| 21 | 2200 |
| 23 | 2300 |

Although hydrocarbon gas dilution with hydrogen or argon can be used, the preferred method is to use only chemically pure hydrocarbon gases.

When it is desired to produce a filament containing refractory metals, metallic vapor is introduced into the process as hereinbefore described. The proportion of metallic vapor to hydrocarbon gas can be varied from 0 to 10 or more; the higher the ratio of metallic vapor employed, the more closely the filament will approach that of a pure refractory metal. The amount of hydrogen gas used can be varied from zero to one part and the pressure can be varied from 2–10 mm. Hg. The preferred ratios of the gases can be expressed as follows:

0–10 parts metallic vapor: 1 part hydrocarbon: 0–1 part hydrogen. To provide a filament which is still in essence pyrolytic graphite, the proportion of metal will be selected to be substantially less than stoichiometric. The appropriate weight proportion will of course vary with the respective molecular weights, but will often be less than 50% by weight of metal, e.g. 1–20 wt. percent.

Utilizing the foregoing ablative filament-making process, various types of refractory and refractory-alloy filament combinations can be produced. For example, a pyrolytic carbon or pyrolytic graphite filament can be made incorporating metals, metal carbides or the like in the crystal latice, e.g. silicon or refractory materials such as boron, tungsten, tantalum, niobium, molybdenum, zirconium, vanadium, titanium, thorium, hafnium and chromium. The metals are obtained by vaporizing various decomposable compounds containing said metals; for example, halides, oxides and various organo-metallic materials, such as carbonyls and dicumene compounds. Typical of refractory-alloy filament combinations would be tantalum-niobium, titanium-tantalum and molybdenum-tungsten.

A pyrolytic carbon filament incorporating boron or other refractory materials offers the characteristic properties of highest strength at low temperatures, as well as at high temperatures. For example, additions of boron in the vapor phase during the deposition process in the fabrication of bulk pyrolytic carbon will increase the room-temperature tensile strength of this material from 18,000 p.s.i. to 30,000 p.s.i. In the deposition process, various metal and non-metal compositions may be produced, such as baron carbide, niobium carbide, tantalum carbide, tungsten carbide, and the like. This method also permits the commercial manufacture of elongated, super-high-temperature alloyed filaments of metals that melt in the range of 5000° F.

Base filaments in continuous lengths produced in accordance with the invention can be protectively coated with ceramics, silicides or refractory metals by means of a flame spray technique. Such filaments can be subjected to the flame spray because of their superhigh-temperature resistance properties. Uniform coatings of such protective materials in extremely long lengths are thus made feasible. Substantially uniform coatings of metals, metal carbides, or ceramics can be applied. Coating with so-called rare metals such as iridium offers protection from oxidation, while aluminum and similar coatings also provide prolonged high-temperature life through ablative effects. Metal carbides may be applied as such or formed in situ. Thus, in coating with silicon tetrachloride and hydrogen, silicon tends to deposit at relatively low coating temperatures, whereas silicon carbide coatings are formed at higher temperatures or upon holding the coated filament at elevated temperature. Likewise, mixtures of silicon tetrachloride and methane deposit silicon carbide or, with an excess of hydrocarbon, a carbon-rich silicon layer of controlled composition is provided.

At higher temperatures, pure pyrolytic graphite becomes stronger and ductile. As the temperature rises, its strength increases. Whereas metallic filaments will melt at extremely high temperature, pyrolytic graphite will improve in physical and structural properties.

The alloying and the making of carbides will tend to improve the properties at lower, and even at room temperatures.

At temperatures of 5000–7000° F., most metals will melt and vaporize, providing a cooling effect to the basic pyrolytic graphite. Therefore, the life of the pyrolytic carbon will be prolonged, with attendant advantages in the missile and rocket fields.

Materials fabricated from the ablative refractory filaments 29 into cloth, forms and the like, which can withstand very high temperatures, are extremely important in the space and missile fields. Due to their high sublimation points, high strength and anisotropic heat-transfer properties at elevated temperatures, pyrolytic graphite filaments and like ablative, refractory filamentary materials are useful for application to rocket nozzles, nozzle liners, and re-entry bodies. High heat transfer over the surface of a nose cone and low transfer through its walls make unusually high rates of ablative and radiative cooling feasible.

Further processing can be used to straighten the aforementioned spiral filaments 29. The filaments 29 can be straightened and stretched to finer and stronger diameters by hot working at high temperatures. This stretching or straightening process is also an integral part of the ablative filament fabrication method heretofore disclosed.

Figure 5:
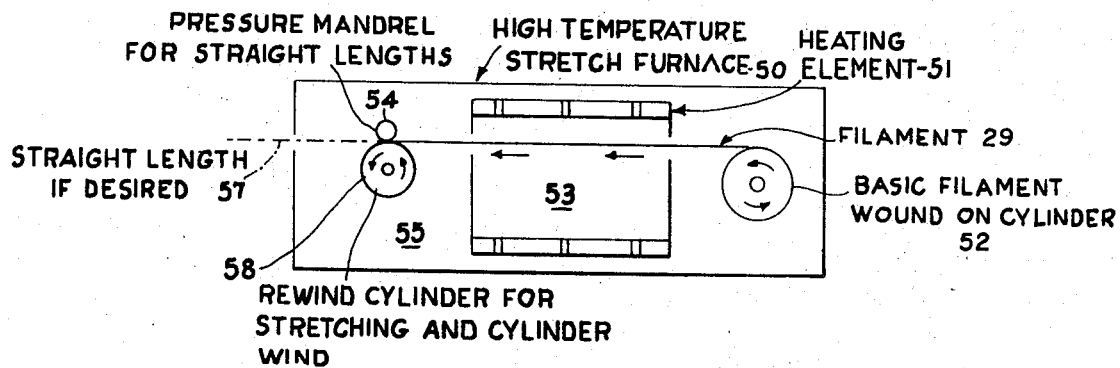
FIG. 5 shows hot-zone straightening and stretching furnaces for the filaments illustrated in FIGS. 3C–3E.

Referring to FIG. 5, a high-temperature, filament-stretching furnace 50 is provided with a heater element 51 for straightening the coiled filaments 29 wound on a spool 52. The ablative filament moves through the heating zone 53 of the furnace, where temperatures of 4500–6500° F. exist, to starighten and stretch the processed filamentary material 29. Pressure mandrels 54 and take-up rewind spools 55 provide for either a straight length of wire filament 57 or for a stretched cylindrical winding 58.

Although at low temperatures pyrolytic graphite is a brittle material, at high temperatures it becomes ductile. Under stress and accompanying elongation, further crystal orientation takes place, with improved alignment of crystal planes and reduction of tilt boundaries between crystals. The result is an improvement in physical properties substantially greater than that which can be achieved by heat treatment alone. Hot stressing of filamentary forms of pyrolytic graphite leads to increased tensile strength and related properties. Thus, the room temperature modulus in tension can be raised from the original value of $2-5 \times 10^6$ p.s.i. to values ranging from $10^7$ upward, approaching the well known theoretical modulus of $14.4 \times 10^7$ for single crystal graphite. Likewise, anisotropy with respect to electrical conductivity is increased from the original ratio of 900–1000 into the range of from 5000 to 10,000, approaching single crystal ratios.

The stretching will usually be conducted at a temperature of at least about 4000° F., and preferably at least about 4500° F. Temperatures up to about 6400° F., and preferably up to 5500° F., are generally best.

The ductility of pyrolytic graphite at temperatures above 4000–4500° F. permits elongation to double the original length, and greater, at stresses of approximately 80,000 p.s.i. However, ordinarily it will be preferable to limit the stretch to a value of up to about 120–130% of the original deposited length, that is to say, to a stretched length of about 1.2–1.3 ft. per ft. of length before stretching. Moreover, for substantial improvement in physical properties, a stretch of at least about 110% of original deposited length is required. These elongations can usually be achieved at stresses of about 20–40,000 p.s.i., avoiding the risk of rupture during stretching. The degree of strain achieved is, of course, also a function of the duration of stressing, and adjustment is accordingly possible by variation in the rotation rate of the drums.

Those pyrolytic graphite filaments containing metal or metal carbide in the crystal lattice may also improve in physical properties by stretching as described. Coated pyrolytic graphite filaments are likewise improved in the same manner, but in this case it will often be preferable to apply the coating after stretching. This is particularly true with coatings of aluminum and the like, which might otherwise be lost at least in part through vaporization at the elevated temperatures of stretching. Filaments formed by depositing pyrolytic graphite on a substrate such as carbon, graphite or carbides can also be improved in physical properties by stretching as described.

It will be apparent to those skilled in the art that various modifications may be made in the processing methods described, or in the resultant products thereof without departing from the spirit and scope of the invention.

What is claimed is:

1. A filament of pyrolytic graphite stretched and elongated to at least about 110% of its original deposited length at a temperature of at least about 4000° F.

2. The filament of claim 1 stretched up to 120% of its original deposited length at a temperature of at least 4500° F.

3. The filament of claim 1 stretched and elongtaed to a length of up to about 130% of its original deposited length.

4. A filament of polycrystalline pyrolytic graphite characterized by a density of 1.95 to 2.24 grams per cubic centimeter stretched and elongated to approximately 120% of its original deposited length, such stretching and elongation being performed at a temperature of at least about 4500° F.

5. A filament of pyrolytic graphite characterized by a density of 1.95 to 2.24 grams per cubic centimeter stretched and elongated to a length of from about 110 to 130% of its original deposited length at a temperature of at least about 4000° F.

References Cited

UNITED STATES PATENTS

| | | | |
|---|---|---|---|
| 683,085 | 9/1901 | Voelker | 23—208 |
| 2,796,331 | 6/1957 | Kauffman et al. | 23—209.4 |
| 2,957,756 | 10/1960 | Bacon | 23—209.2 |
| 3,107,152 | 10/1963 | Ford et al. | 23—209.2 |
| 3,113,893 | 12/1963 | Sloan | 23—208 |
| 3,138,434 | 6/1964 | Diefendorf | 23—209.1 |
| 3,246,950 | 4/1966 | Gruber | 23—208 |

FOREIGN PATENTS 274,883   8/1928   Great Britain.

EDWARD J. MEROS, Primary Examiner

U.S. Cl. X.R.

23—208, 209.1; 106—43, 56; 117—71, 216

UNITED STATES PATENT OFFICE
CERTIFICATE OF CORRECTION

Patent No. 3,531,249　　　　　　　　　　Dated　September 29, 1970

Inventor(s)　Michael Turkat

It is certified that error appears in the above-identified patent and that said Letters Patent are hereby corrected as shown below:

In the heading to the printed specification, line 9, "which in turn is a continuation-in-part of application" should read -- and is related to application --.

Signed and sealed this 15th day of June 1971.

(SEAL)
Attest:

EDWARD M. FLETCHER, JR.　　　　　　　　WILLIAM E. SCHUYLER, JR.
Attesting Officer　　　　　　　　　　　　Commissioner of Patents